J. C. MILLIGAN.
Pan.

No. 168,662.

Patented Oct. 11, 1875.

WITNESSES:
E. Wolff
Alex F. Roberts

INVENTOR:
J. C. Milligan
BY Munn & Co
ATTORNEYS.

UNITED STATES PATENT OFFICE.

JOHN C. MILLIGAN, OF SOUTH ORANGE, NEW JERSEY, ASSIGNOR TO LA-LANCE & GROSJEAN MANUFACTURING COMPANY, OF NEW YORK CITY.

IMPROVEMENT IN PANS.

Specification forming part of Letters Patent No. 168,662, dated October 11, 1875; application filed September 25, 1875.

*To all whom it may concern:*

Be it known that I, JOHN C. MILLIGAN, of South Orange, in the county of Essex and State of New Jersey, have invented a new and useful Improvement in Sheet-Metal Pans, of which the following is a specification:

My invention consists of a downward deflection of the middle portion of the bottom of the pan, in combination with supporting legs or studs on the portion not deflected.

The objects are, first, to enable the pans to be made of thinner and lighter metal without detracting from the capacity to wear; and, second, to increase to some extent the capacity of the pan.

Figure 1:
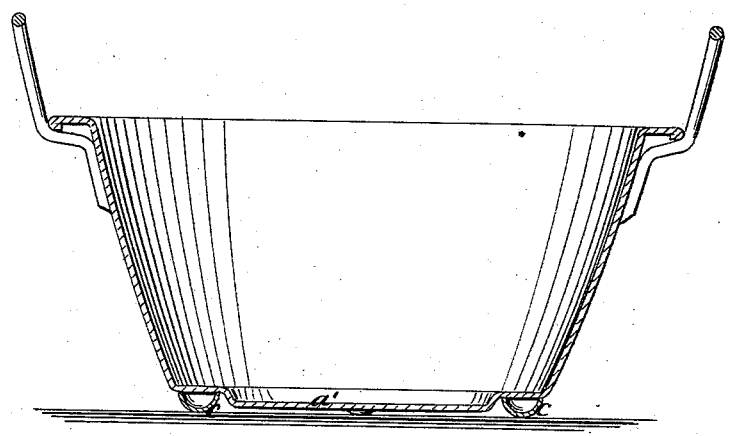
Figure 2:
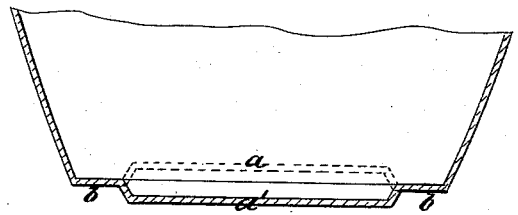

Figure 1 is a sectional elevation of my improved pan; and Fig. 2 is a section with dotted lines, showing how these pans are commonly made.

Similar letters of reference indicate corresponding parts.

It is necessary to make a deflection of some kind or other in the bottom of a sheet-metal pan when made of stock of such thickness as is desirable, to prevent it from buckling.

In practice it has always been turned upward, as represented by the dotted lines $a$, Fig. 2, so as to leave the rim $b$ for the support of the pan. The bottom, being subject to wear in the part $b$, must have considerable thickness to stand the wear, and, besides, the upwardly-deflected part $a$ must be strong enough to sustain itself entirely unsupported by other means, thus necessitating the use of thicker stock than is needed for the sides of the pan; but as the pan is stamped out of one sheet the sides have, therefore, to be made of this thick stock, also. Now, I propose to turn this deflection of the bottom downward, as represented at $a'$, and attach the short legs $c$ to the part $b$ for the support of the pan, so as to take the wear off the deflection, and at the same time support it just enough above the table to prevent it from buckling, but so that when it is forcibly struck downward by dishes and other objects let fall into the pan, it will, by springing slightly, be supported by the table, so as not to be injured or misshaped, although made of much thinner metal than is now used for such pans, and if need be a leg or boss of very slight projection may be attached to the middle of the bottom. Thus I can make pans equally as durable as those now in use, of much lighter stock, and thus economize considerably in the cost, and with sheets of a given size make pans of a little greater capacity, as shown in Fig. 2.

Having thus described my invention, I claim as new and desire to secure by Letters Patent—

A sheet-metal pan having, in combination with a downwardly-deflected portion of the bottom $a'$, supporting-legs C, attached to the undeflected part $b$ of the bottom, substantially as specified.

JOHN C. MILLIGAN.

Witnesses:
    T. B. MOSHER,
    ALEX. F. ROBERTS.